Figure 3:
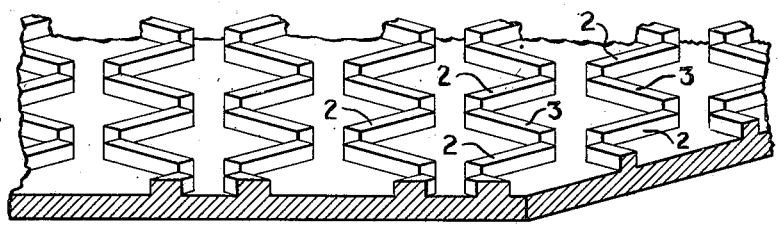

Jan. 9, 1923. 1,441,327

J. BLUM.
NONSLIPPING, CLEANABLE TREAD.
FILED JUNE 14, 1919.

INVENTOR
Julius Blum
BY
N. J. Bissing
ATTORNEY

Patented Jan. 9, 1923.

1,441,327

UNITED STATES PATENT OFFICE.

JULIUS BLUM, OF ARDSLEY-ON-HUDSON, NEW YORK.

NONSLIPPING, CLEANABLE TREAD.

Application filed June 14, 1919. Serial No. 304,294.

*To all whom it may concern:*

Be it known that I, JULIUS BLUM, a citizen of the United States, residing at Ardsley-on-Hudson, in the State of New York, have invented certain new and useful Improvements in Nonslipping, Cleanable Treads, of which the following is a specification.

My invention relates to non-slipping surfaces such as treads for stairs, walks, floor plates, door saddles, platforms, conduit covers and the like and has for its object to provide a non-slipping tread affording protection against slipping in one of two ways or any way across the tread, at the same time providing means whereby the tread will not collect dirt, water, ice or oil and may be easily cleaned.

Another object of my invention is to provide a non-slipping tread of low weight per square foot, over which trucks or wheeled surfaces or bales can be drawn or dragged in any direction with equal ease as to direction and with equal protection against slippage, at the same time providing means whereby said treads can be easily cleaned by brushing or washing them in any one of several directions.

Another object of my invention is to preserve the non-slipping function of the tread provided with ribs together with an easily cleanable function whereby it may be cleaned in several directions. Such plates would otherwise collect dirt in their corners thereby making them slippery and destroying or modifying their non-slipping qualities. No matter where the dirt collects in my tread nor where it settles the tread can readily be cleaned.

Another object of the invention is to provide a cleanable, non-slipping tread whose plates may be readily joined without disfiguring the design and into which screws can be readily located without having to seek special portions of the plate when screwing it down upon its support.

In accordance with a particular embodiment of my invention, I provide a non-slipping, cleanable tread consisting of a body plate with two sets of integral raised oblong ribs the length of each rib being greater than its width, each rib being of sufficient length and height to prevent slipping, the ribs of each set running in parallel rows and the ribs of one set crossing the rows of another at an acute angle, the ribs being separated at their junctions, where otherwise corners would form, so as to permit cleaning. Each row of ribs comprises a plurality of oblong, longitudinal ribs extending along the row. I also make the distance between the ends of the pair of ribs of one row greater than the width of the rib of the intersecting row, thus providing additional cleaning means.

It will be observed that the tread constituting my invention in addition to being readily cleaned has a self-cleaning or self-clearing tendency. Oil, dirt, ice and water which would otherwise collect on the treads and clog them will in the case of my tread run off in great measure and can be removed by a suitable cleaning instrument such as a hose or broom.

With the above and other objects in view my invention consists in the parts, improvements and combinations more particularly pointed out hereinafter.

Figure 1:
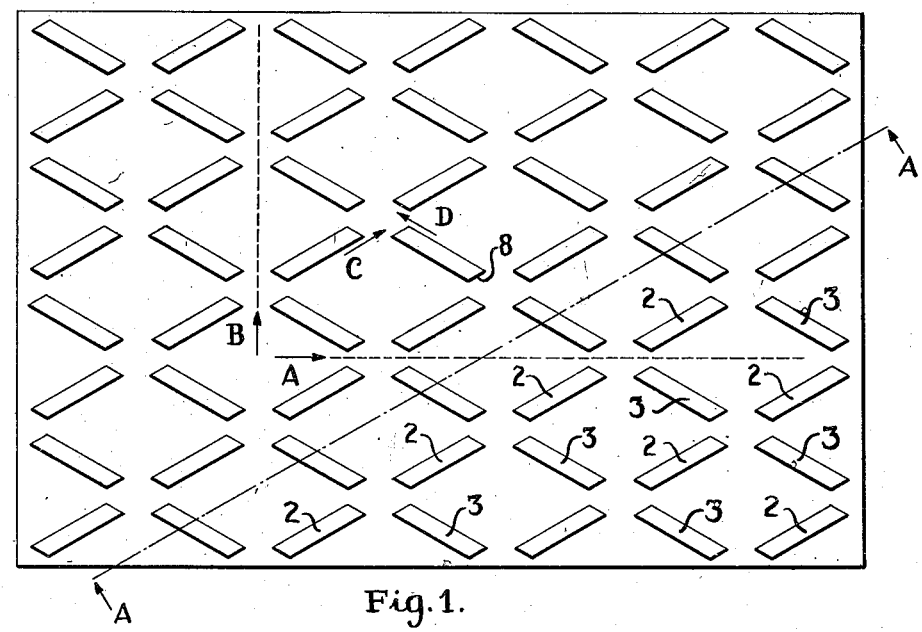
Figure 2:
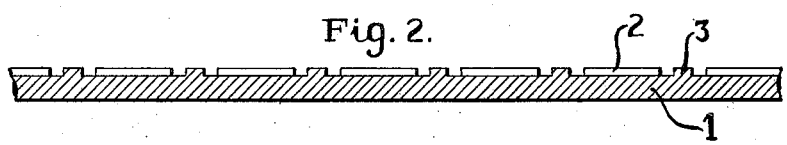
Figure 4:
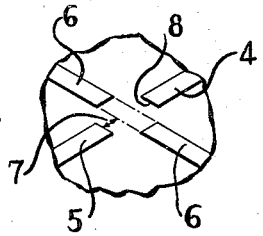

Referring now to the drawings, Fig. 1 is a plan view of the improved tread. Fig. 2 is a cross sectional view on line A—A of Fig. 1. Fig. 3 is a perspective view showing the raised ribs somewhat exaggerated in height. Fig. 4 is a detail plan view of one of the junction points between the ribs.

The improved tread comprises a body portion 1 carrying a series of raised ribs, 2, 3 integral therewith and projecting therefrom. Such plates are usually made of steel. A plurality of sets of integral ribs are utilized. In the particular embodiment of the invention illustrated, the body plate or portion of the tread is provided with two sets of integral ribs. The ribs of one set may be designated by the numeral 2 and those of the other set by numeral 3. The ribs of each set run in parallel rows and the ribs of one set cross those of the other set at an angle. In the particular embodiment of the invention illustrated the ribs cross each other at an acute angle, less than ninety degrees. Lozenged shaped spaces are thus formed between the sides or body portions of the ribs which enclose the space.

In order to provide means for self-clearing and for cleaning the tread the ribs instead of meeting each other at corners are separated at their junctions. It will thus be seen, as shown by the arrows A, B, that the tread can be readily cleaned in two directions. The spaces between certain of the ribs lie along the dotted line having the direction of the arrow A, whereas the spaces between other ribs lie along the dotted line having the direction of the arrow B at right angles to the former arrow.

Ribs having sharp edges to prevent slipping are likely to collect dirt. In addition to separating of the junctions of the ribs so as to form spaces arranged in rows at right angles to each other which will permit cleaning the plates by brushing or scrubbing in the directions indicated, I provide additional means enabling the plates to be readily cleaned by brushing or scrubbing in other directions. At the junction of the ribs as illustrated in Fig. 4 and in Fig. 1, the distance between the ends of each pair 4, 5 of adjacent ribs of the same row is greater than the width of the rib 6 of the intersecting rib row. In this way the rib 5 is spaced away from the line of the edge of the rib 6 by a distance 7. Dirt, water or oil which might collect at the bottoms of the sides of the rib will tend to move out and can be swept out readily by a broom or hose properly directed along the edge of rib 6. In this way additional directions of cleaning are provided indicated by the arrows C, D which correspond to the directions of the rows of ribs.

In order not to diminish the length and extent of the non-slipping rib portions too much, at the same time retaining the additional cleansing function effected by spacing away one rib from the line of the edge of the intersecting rib, I make this distance indicated by the numeral 7 a fraction of the width of the rib, thus keeping it of small dimension. The spaces between ends of ribs are short and the ribs are correspondingly longer. The distance between the ends of each pair of adjacent ribs of the rows of one set is made greater than the width of the ribs of the other set by an amount equal to the width of a rib plus a fraction of its width.

In order to provide for an easy, smooth, sweeping action, I may slant the end of each rib at the junction as indicated by the numeral 8. In this way the end of each rib is inclined at the same angle as that of the direction of the intersecting row of ribs. By sweeping in the direction of a row of ribs the broom and dirt do not catch at the inclined end of the intersecting rib.

Having thus described this invention, its operation will be clear. Dirt will not lodge or clog up the ribs, the tread can be easily cleaned and it affords safety against slipping when walking across or when objects are wheeled or drawn across the tread in any direction.

What I claim is:

1. A non-slipping, cleanable tread comprising a body plate provided with a plurality of sets of integral raised ribs, the ribs of each set running in parallel rows, each row comprising a plurality of oblong, longitudinal ribs, extending along the row, the length of each rib being greater than its width, one set of ribs crossing another set at an acute angle, the ribs being separated at their junctions so as to permit cleaning.

2. A non-slipping, cleanable tread comprising a body plate provided with two sets of integral raised ribs, the ribs of each set running in parallel rows, each row comprising a plurality of oblong, longitudinal ribs, extending along the row, the length of each rib being greater than its width, and the ribs of one set crossing those of the other set at an angle, the ribs being separated at their junctions so as to permit cleaning.

3. A non-slipping, cleanable tread comprising a body plate provided with two sets of integral raised ribs, the ribs of each set running in parallel rows, each row comprising a plurality of oblong, longitudinal ribs, extending along the row, the length of each rib being greater than its width, and the ribs of one set crossing those of the other set at an acute angle so as to form lozenged shaped spaces between the bodies of the ribs, the ribs being separated at their junctions so as to permit cleaning.

4. A non-slipping, cleanable tread comprising a body plate provided with two sets of integral raised ribs, the ribs of each set running in parallel rows, each row comprising a plurality of oblong, longitudinal ribs, extending along the row, and the ribs of one set crossing those of the other set at an acute angle, the end of each rib being inclined to the body of the rib, the distance between the ends of each pair of adjacent ribs of the same row being greater than the width of the rib of the intersecting rib row.

5. A non-slipping, cleanable tread comprising a body plate provided with two sets of integral raised ribs, the ribs of each set running in parallel rows, each row comprising a plurality of oblong, longitudinal ribs, extending along the row and the ribs of one set crossing those of the other set at an acute angle, the end of each rib being inclined to the body of the rib, the distance between the ends of each pair of adjacent ribs of the rows of one set being greater than the width of the ribs of the other set by an amount equal to that of a rib plus a fraction of the width of the rib.

6. A non-slipping, cleanable tread comprising a body plate provided with two sets of integral oblong ribs, each rib being of sufficient length and height to prevent slipping, the ribs of each set running in parallel rows, each row comprising a plurality of oblong, longitudinal ribs, extending along the row and the ribs of one set crossing those of the other set at an acute angle, each rib of each set being cut away at the junctions, the distance between the ends of each pair of adjacent ribs of the rows of one set being greater than the width of the ribs of the other set by an amount equal to a rib plus that of the fraction of the width of the rib, the end of each rib at a junction being inclined at the same angle as that of the direction of the intersecting row of ribs.

7. A non-slipping, cleanable tread, comprising a body plate provided with two sets of integral raised ribs, the ribs of each set running in parallel rows and the ribs of one set crossing those of the other set at an angle of less than 90 degrees, the said ribs having common crossing points, thus providing rows of spaces, the rows of spaces extending at right angles to each other and each row of spaces being arranged at an angle of less than 90 degrees with reference to the rows of ribs.

In testimony whereof, I have signed my name to this specification.

JULIUS BLUM.